(12) United States Patent
Latvala

(10) Patent No.: US 7,389,353 B2
(45) Date of Patent: Jun. 17, 2008

(54) METHOD, SYSTEM AND MIRROR DRIVER FOR LAN MIRRORING

(75) Inventor: Mikael Latvala, Helsinki (FI)

(73) Assignee: Nokia Corporation, Espoo (FI)

( * ) Notice: Subject to any disclaimer, the term of this patent is extended or adjusted under 35 U.S.C. 154(b) by 743 days.

(21) Appl. No.: 10/347,864

(22) Filed: Jan. 22, 2003

(65) Prior Publication Data
US 2004/0143680 A1 Jul. 22, 2004

(51) Int. Cl.
G06F 15/16 (2006.01)
(52) U.S. Cl. .................. 709/228; 709/227; 709/228
(58) Field of Classification Search ......... 709/227–228
See application file for complete search history.

(56) References Cited

U.S. PATENT DOCUMENTS

| | | | |
|---|---|---|---|
| 6,778,532 B1 * | 8/2004 | Akahane et al. ............ 370/392 |
| 6,978,384 B1 * | 12/2005 | Milliken ...................... 709/227 |
| 2002/0075873 A1 * | 6/2002 | Lindhorst-Ko et al. ..... 370/394 |
| 2003/0046409 A1 * | 3/2003 | Graham ....................... 709/229 |
| 2003/0048782 A1 * | 3/2003 | Rogers et al. ............... 370/389 |
| 2003/0231596 A1 * | 12/2003 | Hong .......................... 370/252 |
| 2004/0117498 A1 * | 6/2004 | Hashimoto et al. ......... 709/230 |
| 2005/0180356 A1 * | 8/2005 | Gillies et al. ............... 370/329 |

* cited by examiner

*Primary Examiner*—Nathan Flynn
*Assistant Examiner*—Mohamed Wasel
(74) *Attorney, Agent, or Firm*—Foley & Lardner LLP

(57) ABSTRACT

The present invention describes a method, system and mirror driver for discarding data frames in mirrored data communication networks. In the method, at least one data structure comprising one or more entries is created and maintained, an entry comprising at least a current sender data frame sequence number. When a data frame is received, a hash code is computed using then sender address and the receiver address of the received data frame, the hash code being an index to the table. The current sender data frame sequence number is checked in the entry indexed by the computed hash code, and if the sequence number of the received frame is smaller than the current sender data frame sequence number in the entry, the data frame is discarded as being a duplicate frame.

38 Claims, 5 Drawing Sheets

METHOD, SYSTEM AND MIRROR DRIVER FOR LAN MIRRORING

FIELD OF THE INVENTION

The present invention relates to mobile telecommunication systems. In particular, the present invention relates to a novel and improved method, system and mirror driver for discarding data frames in mirrored data communication networks.

BACKGROUND OF THE INVENTION

Local Area Network (LAN) mirroring is used in systems which require a fault tolerant communication mechanism. In general, LAN mirroring means that frames sent between a sender and a receiver are sent via multiple routes (two or more). The basic idea behind LAN mirroring is that it is highly unlikely that all the duplicates of a frame would disappear. Therefore, the receiver will receive at least one of the frames. Usually the redundant LAN architecture assumes that a failure in one LAN is usually isolated from another LAN(s). Thus a node can communicate with other nodes even if one LAN cannot be used to send frames to other nodes.

FIG. 1 describes a basic system architecture for LAN mirroring. FIG. 1 comprises a sender, a receiver and two distinct LANs LAN1, LAN2 which connects the sender and receiver to each other. The sender sends a frame #X to via both LANs to the receiver. Although the main idea behind using LAN mirroring is very simple, there still exists some difficulties that must be taken care of:

- The receiver must discard the duplicates, i.e. the receiver must know which frames it must accept and which reject.
- The receiver must get back in synchronization after a failure of a sender or a receiver without requiring assistance from the user or having to inform the sender.
- The sender and receiver must get in synchronization after the system has been started or restarted.
- LAN mirroring must be transparent to upper level protocols (e.g. Internet Protocol (IP) and Address Resolution Protocol (ARP)).

SUMMARY OF THE INVENTION

The present invention describes a solution for discarding duplicated packets in a mirrored data communication network.

In particular, the present invention discloses a method for sending duplicated frames in a mirrored data communication network system comprising at least one sender node and at least one receiver node and at least two data communication networks between a sender and receiver node. The method comprises the steps of creating and maintaining at least one data structure comprising one or more entries, an entry comprising at least a current receiver data frame sequence number, finding out the current receiver data frame sequence number based on the receiver address information, marking the data frame to be sent to the receiver via the data communication networks with the current receiver data frame sequence number, duplicating the data frame, sending the data frame to the receiver via at least two data communication networks and updating the receiver data frame sequence number within the entry.

In one embodiment of the present invention, the method further comprises the step of selecting a sequence number to be used as the current receiver data frame sequence number.

In one embodiment of the present invention, the current receiver data frame sequence numbers are incorporated in one of a mirror hearer, a VID field in the VLAN tag or 802.2 SNAP org field.

Furthermore, the present invention discloses a method for receiving duplicated frames in a mirrored data communication network system comprising at least one sender node and at least one receiver node and at least two data communication networks between a sender and receiver node. The method comprises the steps of creating and maintaining at least one data structure comprising one or more entries, an entry comprising at least a current sender data frame sequence number, receiving a data frame, computing a hash code using at least the sender address and the receiver address of the received data frame, the hash code being an index to the data structure, checking the current sender data frame sequence number in the entry indexed by the computed hash code, and if the sequence number of the received frame does not fulfill a predetermined condition in comparison with the current sender data frame sequence number in the entry, discarding the data frame. The data structure refers e.g. to a table.

In one embodiment, a predetermined condition is that the data frame is discarded if the sequence number of the received frame is smaller than the current sender data frame sequence number in the entry. In another embodiment, data frame is discarded if the sequence number of the received frame is greater than the current sender data frame sequence number in the entry.

In one embodiment of the present invention, if the sequence number of the received data frame is equal or greater than the current sender data frame sequence number in the entry incremented by a predetermined window size, the data frame is discarded. In another embodiment, the data frame is discarded if the sequence number of the received data frame is equal or smaller than the current sender data frame sequence number in the entry decremented by a predetermined window size.

In one embodiment of the present invention, a discard counter is maintained for each sender. The discard counter counts discarded data frames from a particular sender.

In one embodiment of the present invention, the method further comprises the steps of counting discarded data frames of a sender with the discard counter; and when the discard counter exceeds a predetermined discard threshold value, determining that the sender is not synchronized, resetting the discard counter of the sender, accepting the next packet from the sender automatically, and updating the current receiver data frame sequence number.

In one embodiment of the present invention, if the predetermined condition is fulfilled, the method further comprises the steps of accepting the data frame, updating the current sender data frame sequence number, and resetting the discard counter of the sender.

In one embodiment of the present invention, when the receiver is out of synchronization, the method further comprises the steps of entering into a starting phase, accepting the next packet from each sender automatically, and updating the current receiver data frame sequence number. Out of synchronization means that either sending or receiving end sends or receives a packet that is labeled with an incorrect data frame sequence number.

The present invention discloses also a system for sending duplicated frames in a mirrored data communication network system comprising at least one sender node and at least one receiver node and at least two data communication networks between a sender and receiver node, wherein a data frame is duplicated and sent to a receiver via at least two data communication networks, wherein the system further comprises at least one data structure comprising one or more entries, an entry comprising at least receiver identification information and a current receiver data frame sequence number, means for finding out the current receiver data frame sequence number based on the receiver address information, means for marking the data frame to be sent to the receiver via the data communication networks with the current receiver data frame sequence number, means for duplicating the data frame, means for sending the data frame to the receiver via at least two data communication networks, and means for updating the current receiver data frame sequence number.

In one embodiment of the system of the present invention, the system further comprises means for selecting a sequence number to be used as the current receiver data frame sequence number if the sender is starting or restarted.

In one embodiment of the system of the present invention, the current receiver data frame sequence numbers are incorporated in one of a mirror hearer, a VID field in the VLAN tag or 802.2 SNAP org field.

The present invention further discloses a system for receiving duplicated frames in a mirrored data communication network system comprising at least one sender node and at least one receiver node, at least two data communication networks between a sender and receiver node, wherein a data frame is duplicated and sent to a receiver via at least two data communication networks, wherein the system comprises at least one data structure comprising one or more entries, an entry comprising at least a current sender data frame sequence number, means for receiving a data frame, means for computing a hash code using the sender address and the receiver address of the received data frame, the hash code being an index to the data structure, means for checking the current sender data frame sequence number in the entry indexed by the computed hash code, and means for discarding the data frame, wherein the received frame is discarded if the sequence number of the received frame does not fulfill a predetermined condition in comparison with the current sender data frame sequence number in the entry.

In one embodiment of the system of the present invention, means for discarding are arranged to discard the data frame if the sequence number of the received frame is smaller than the current sender data frame sequence number in the entry. In another embodiment of the system of the present invention, means for discarding are arranged to discard the data frame if the sequence number of the received frame is greater than the current sender data frame sequence number in the entry.

In one embodiment of the system of the present invention, means for discarding are arranged to discard the data frame if the sequence number of the received data frame, is equal or greater than the current sender data frame sequence number in the entry incremented by a predetermined window size. In another embodiment of the system of the present invention, means for discarding are arranged to discard the data frame if sequence number of the received data frame is equal or smaller than the current sender data frame sequence number in the entry decremented by a predetermined window size.

In one embodiment of the system of the present invention, the system further comprises a discard counter for each sender arranged to count discarded data frames of a sender.

In one embodiment of the system of the present invention, the system further comprises a predetermined discard threshold value, means for determining that the sender is not synchronized when the discard counter exceeds the predetermined discard threshold value, means for resetting the discard counter of the sender, means for accepting the next packet from the sender automatically, and means for updating the current sender data frame sequence number.

In one embodiment of the system of the present invention, the system further comprises means for accepting the data frame, means for accepting being arranged to accept the data frame if the predetermined condition is fulfilled, means for updating the current sender data frame sequence number, and means for resetting the discard counter of the sender.

In one embodiment of the system of the present invention, the system further comprises means for determining that the receiver is out of synchronization, means for accepting the next packet from each sender automatically, means for updating the current receiver data frame sequence number.

The present invention discloses also a mirror driver for sending duplicated frames in a mirrored data communication network and a mirror driver for receiving duplicated frames in a mirrored data communication network system.

The present invention has several advantages over the prior-art solutions. In the solution described in the present invention, an unsynchronized receiver does not require manual maintenance interventions. A further advantage is that the sender does not have to be informed when the receiver has gone out of synchronization. Furthermore, it does not have to change its behavior. The receiver gets in synchronization immediately after the failure of the receiver node has happened. The time required by the receiver to get in synchronization after a failure of a sender node is dependent only on the discardThreshold value: the lower the value, the sooner the receiver gets back in synchronization.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE INVENTION

Reference will now be made in detail to the embodiments of the present invention, examples of which are illustrated in the accompanying drawings.

Figure 1:
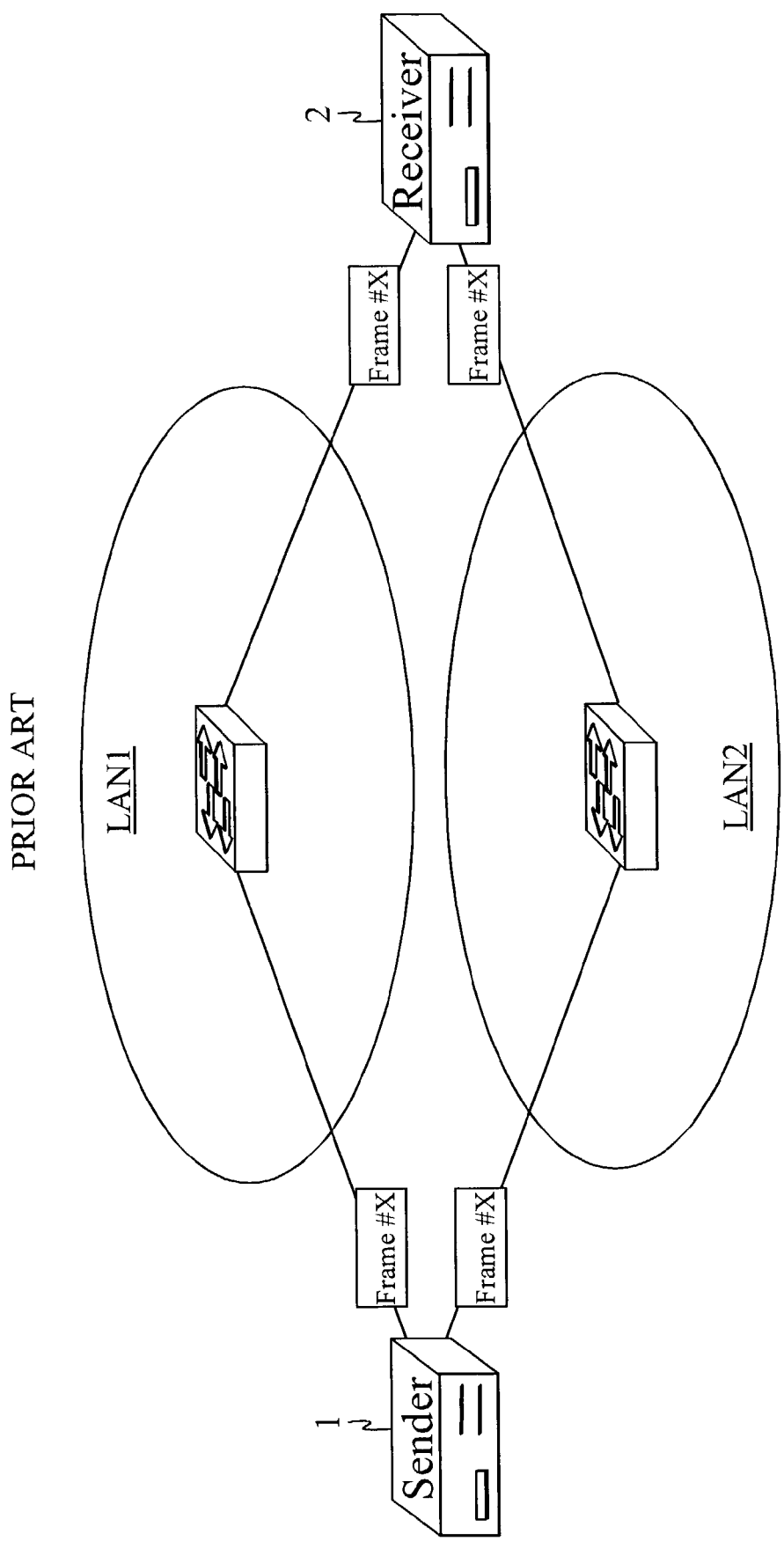
FIG. 1 illustrates a simplified prior art system architecture illustrating the mirroring concept of data communication networks.
Figure 2A:
FIG. 2*a* illustrates an exemplary data structure for a sender in accordance with the present invention.
Figure 2A:
Figure 2A:
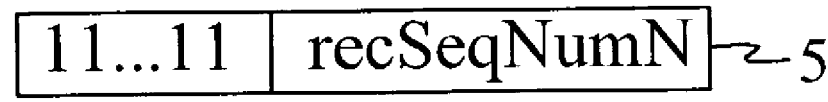

FIG. 2*a* illustrates an exemplary data structure at a sender side in a mirrored data communication network. The data structure is e.g. a table although any other appropriate data structure can be used. The sender maintains a single sequence number for each receiver. A table entry may contain also additional information, e.g. the address of a sender and/or receiver. The receiver is denoted e.g. by a 48 bit MAC address, a 48 bit MAC address and a 12 bit VLAN tag, a 48 bit MAC address and a three-bit priority tag, or a 48 bit MAC address, a 12 bit VLAN tag and a three-bit priority tag. The table comprises entries 00 . . . 01 . . . 11 . . . 11 (marked as 3, 4, 5). The table is indexed so that e.g. index 00 . . . 10 points to the second entry 4 of the table (recSeqNum2). The table index is computed e.g. by hashing the receiver's Media Access Control (MAC) address. Hashing can be explained as transformation of a string of characters into a usually shorter fixed-length value or key that represents the original string. When a packet has been sent to a receiver, the corresponding sequence number (recSeqNum) is changed, e.g. incremented by one in order to distinguish packet from each other.

Figure 2B:
FIG. 2*b* illustrates an exemplary data structure for a receiver in accordance with the present invention.
Figure 2B:
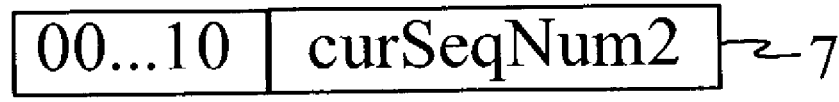
Figure 2B:

FIG. 2b illustrates an exemplary data structure at a receiver side in a mirrored data communication network. The data structure is e.g. a table although any other appropriate data structure can be used. The receiver maintains a sequence number related to the sender. A table entry may contain also additional information, e.g. the address of a sender and/or receiver. The table comprises entries 00 . . . 01 . . . 11 . . . 11 (marked as 6, 7, 8). The entries are is indexed so that e.g. index 00 . . . 10 points to the second entry 7 of the table (curSeqNum2). The table index is computed e.g. by hashing the MAC address of the sender and the receiver. The hashing function may be implemented e.g. by a simple XOR function. Also any other appropriate function can also be used as the hashing function. When a duplicate packet has been received, the corresponding sequence number (curSeqNum) is updated e.g. by incrementing the previous value by one.

Figure 3:
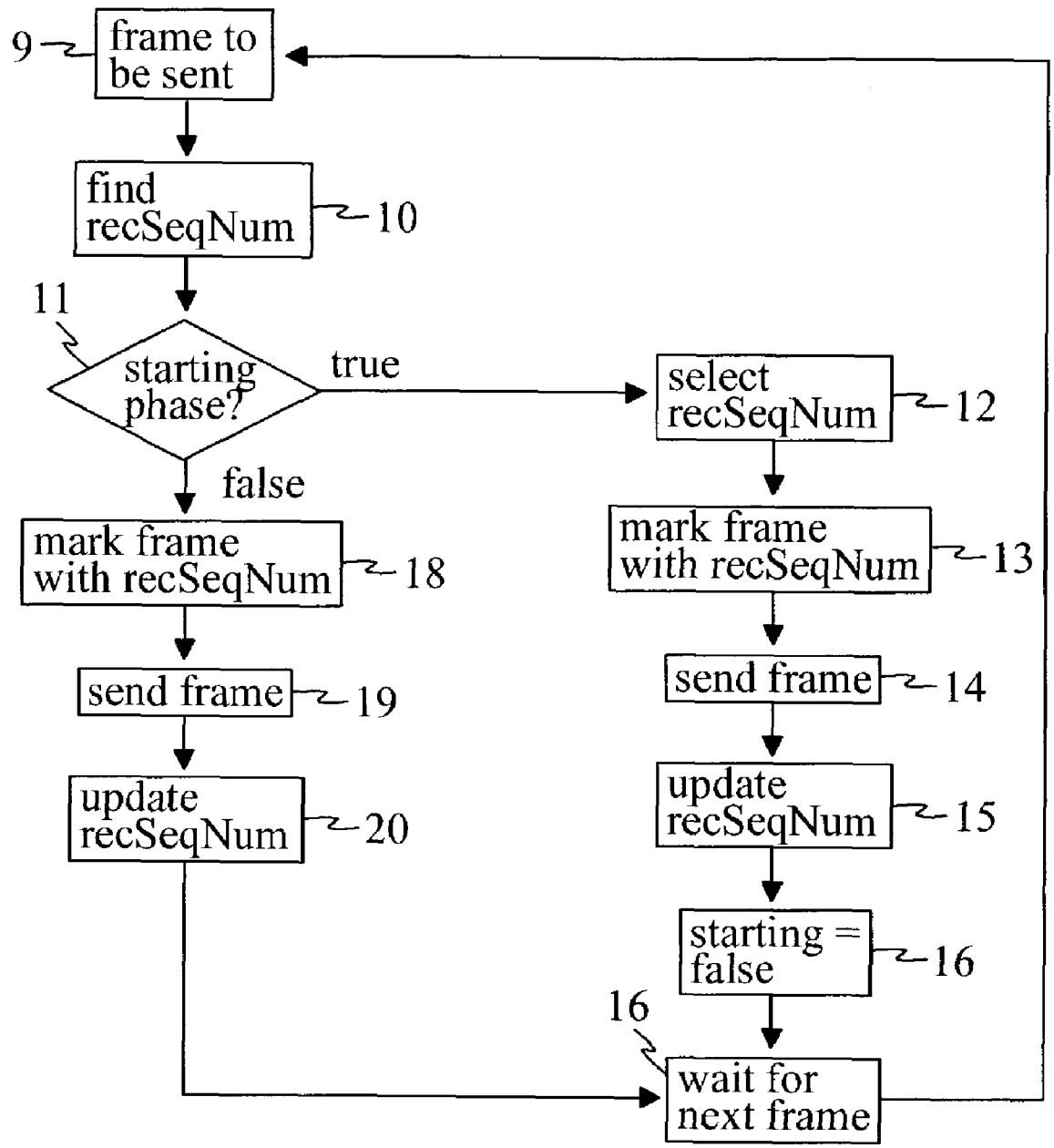
FIG. 3 illustrates an exemplary flow chart describing the method for a sender in accordance with the present invention.

FIG. 3 illustrates an exemplary flow chart describing the method for a sender. The sender maintains a single sequence number (recSeqNum) for each receiver. In the sending process of data frames, the sender has one or more frames to be sent to one or more receivers (9). The sender finds the current receiver sequence number for a particular receiver based on the receiver's MAC address (10). The finding of a sequence number is described with FIG. 2. If the sender is in a starting phase (11), it selects a sequence number e.g. randomly (12). Randomness of the initial sequence number prevents the scenario where sender is in infinite restart loop and frames from the sender's previous karma (i.e. before the most recent restart) are still in the communication network. A reason for being in the starting phase is e.g. that the sender has been restarted and the previously used sequence numbers have been destroyed.

The frame to be sent is marked with the selected sequence number (13), duplicated and then sent to the receiver (14) via multiple data communication networks. The current sequence number (recSeqNum) of the receiver is then updated e.g. by incrementing the previous value by one (15). The sender is no longer in the starting phase (16) and is therefore ready to send further packets to various receivers (17).

If the sender is not from the beginning in the starting phase (11), the frame to be sent is marked with the selected sequence number (18), duplicated and then sent to the receiver (19). The current sequence number (recSeqNum) of the receiver is then updated e.g. by incrementing the previous value by one (20). The sender is now ready to send further packets to various receivers (17).

Figure 4:
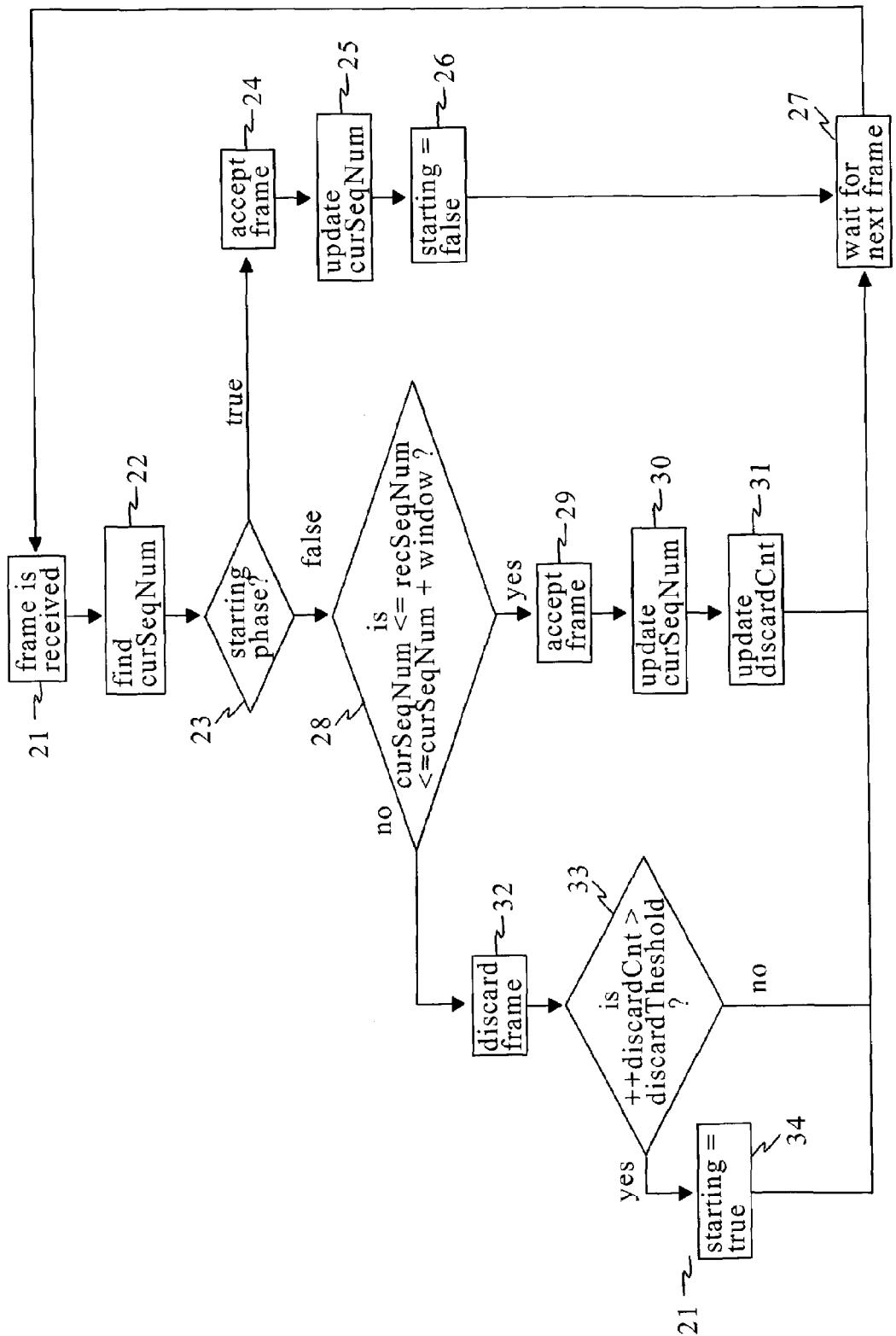
FIG. 4 illustrates an exemplary flow chart describing the method for a receiver in accordance with the present invention.

FIG. 4 illustrates an exemplary system in accordance with the present invention. On the receiver's side, detection of duplicate frames relies on a sliding window. The receiver maintains a current sequence number for each sender (curSeqNum) and a window size of N, the size being large enough so that both frames can be lost few times in sequences without causing the receiver to get out of synchronization. The receiver also keeps a record of discarded frames (discardCnt variable) for each sender.

The flow diagram begins with a reception of a data frame (21). Each frame comprises a sequence number (recSeqNum) inserted therein by the sender. The receiver finds out the current sequence number (curSeqNum) stored in a table (22). The table is typically a hash table comprising one or more entries each of which comprising at least the current sender sequence number (curSeqNum). The index to the current sequence number (curSeqNum) is computed e.g. with the XOR function by XORing N lowest bits of the destination MAC address (receiver's MAC address) with N lowest bit of the source MAC address (sender's MAC address). In one embodiment of FIG. 4, when calculating a hash key, the following alternatives can be used as a hash key:

a 48 bit MAC address,
a 48 bit MAC address and a 12 bit VLAN tag,
a 48 bit MAC address and a three-bit priority tag,
a 48 bit MAC address, a 12 bit VLAN tag and a three-bit priority tag.

If the receiver is in a starting phase (23) (e.g. because of restarting etc.), it automatically accepts the received frame (24) and updates the current sequence number (curSeqNum) based on the received sequence number (recSeqNum) of the frame e.g. by incrementing the received sequence number by one (25). Therefore, the receiver is no longer in the starting phase (26) and is ready to receive next frames (27).

If the receiver is in the starting phase (23), a comparison is made whether the received sequence number (recSeqNum) is equal or greater than the current sequence number (curSeqNum) and, at the same time, smaller than the current sequence number (curSeqNum) incremented by the window size (28). If the answer is yes, the frame is accepted (29) and the current sequence number (curSeqNum) updated e.g. by incrementing the previous value by one (30). Furthermore, the discard counter (discardCnt) is set to zero (31) because the frame was accepted (the frame was not a duplicate frame).

If condition (28) is not fulfilled, the frame is discarded (32). Furthermore, if the incremented discard counter value (++discardCnt) is greater than the discard threshold value (discardThreshold) (33), it is determined that the receiver is out of synchronization (34) and the starting variable is set to true value. The receiver gets out of synchronization because either the sender or receiver is (re)started and subsequent frames received are outside the window. Therefore, the receiver is not able to get back in synchronization with the sender. To recover from the out of synchronization event, the receiver is put in the starting phase for this particular sender.

It must be noted that the size of the hash table is known i.e. it is the total number of the senders. Therefore, dynamic memory allocation for hash table entries is not needed. Furthermore, FIGS. 3 and 4 describe only exemplary solutions for sending and receiving side. It is apparent that other discarding conditions related to sequence numbers can be used.

Figure 5:
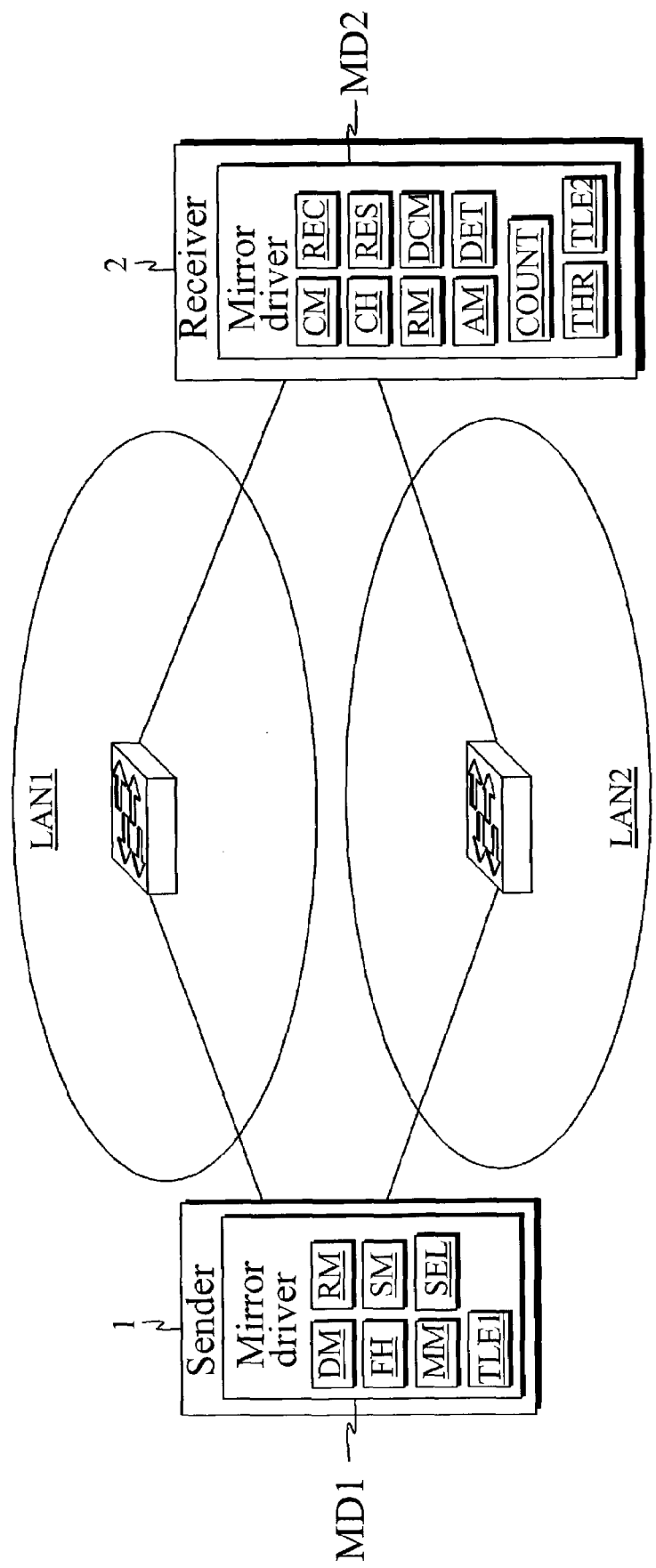
FIG. 5 illustrates one embodiment of the system architecture in accordance with the present invention.

FIG. 5 illustrates one embodiment of the system in accordance with the present invention. The simplified system comprises a sender 1 and a receiver 2 and two data communication networks LAN1, LAN2 between the sender 1 and the receiver 2. A data frame sent by the sender 1 is sent to the receiver 2 via both LANs LAN1 and LAN2. The sender and receiver are e.g. computers, routers, switches etc.

According to the present invention, the sender comprises at least one data structure TLE1 comprising one or more entries, an entry comprising at least receiver identification information and a current receiver data frame sequence number of the receiver, means for finding FM out the current receiver data frame sequence number based on the receiver address information, means for marking MM the data frame to be sent to the receiver via the data communication networks with the current receiver data frame sequence number, means for duplicating DM the data frame, means for sending SM the data frame to the receiver via at least two data communication networks, and means for incrementing RM the current receiver data frame sequence number.

In this embodiment, the sender further comprises means for selecting SEL a sequence number to be used as the current receiver data frame sequence number if the sender is starting or restarted.

In one embodiment of FIG. 5, the current receiver data frame sequence numbers are incorporated in one of a mirror hearer, a VID field in the VLAN tag or 802.2 SNAP org field.

According to the present invention, the receiver comprises at least one data structure TLE2 comprising one or more entries, an entry comprising at least sender and receiver identification information and a current sender data frame sequence number of the sender, means for receiving REC data frames, means for computing CM a hash code using the sender address and the receiver address of the received data frame, the hash code being an index to the data structure, means for checking CH the current sender data frame sequence number in the entry indexed by the computed hash code, and means for discarding DCM the data frame, wherein the received frame is discarded if the sequence number of the received frame is smaller than the current sender data frame sequence number in the entry.

In this embodiment, means for discarding DCM are arranged to discard the data frame if the sequence number of the received data frame is equal or greater than the current sender data frame sequence number in the entry incremented by a predetermined window size. The receiver further comprises a discard counter COUNT for each sender, wherein the discard counter COUNT is arranged to count discarded data frames of a sender, a predetermined discard threshold value THR, means for determining DET that the sender is not synchronized when the discard counter exceeds the predetermined discard threshold value, means for resetting RES the discard counter of the sender, means for accepting AM the next packet from the sender automatically, and means for incrementing RM the current sender data frame sequence number.

In one embodiment, means for accepting AM the data frame are arranged to accept the data frame if the sequence number of the received data frame is equal or greater than /the current sender data frame sequence number and equal or smaller than the current sender data frame sequence number in the entry incremented by a predetermined window size.

The aforementioned means are implemented in a mirror driver (mirror driver MD1 in the sending side and mirror driver MD2 in the receiving side).

The aforementioned means, data structure and variables are implemented in a known manner preferably with software and/or hardware, and therefore they are not described in more detail.

One of the advantages of the present invention is that an unsynchronized receiver does not require manual maintenance interventions. A further advantage is that the sender does not have to be informed when the receiver has gone out of synchronization. Furthermore, it does not have to change its behavior. The receiver gets in synchronization immediately after the failure of the receiver node has happened. The time required by the receiver to get in synchronization after a failure of sender node is dependent only on the discardThreshold value: the lower the value, the sooner the receiver gets back in synchronization.

It is obvious to a person skilled in the art that with the advancement of technology, the basic idea of the invention may be implemented in various ways. The invention and its embodiments are thus not limited to the examples described above, instead they may vary within the scope of the claims.

The invention claimed is:

1. A method for sending duplicated frames in a mirrored data communication network system comprising at least one sender node and at least one receiver node and at least two data communication networks between a sender node and a receiver node, wherein the method comprises the steps of:
   creating and maintaining at least one data structure comprising one or more entries, an entry comprising at least a current receiver data frame sequence number, wherein a single current receiver data frame sequence number is maintained for each receiver node, and a current sender data frame sequence number is maintained for each sender node;
   finding out the current receiver data frame sequence number based on the receiver address information;
   marking the data frame to be sent to the receiver node via the data communication networks with the current receiver data frame sequence number;
   duplicating the data frame;
   sending the data frame to the receiver node via at least two data communication networks; and
   at least one of updating the receiver data frame sequence number within the entry and putting the receiver node into a starting phase to resynchronize the receiver node with the sender node if the receiver node has become unsynchronized with the sender node.

2. The method according to claim 1, wherein if the sender is starting or restarted, the method further comprises the step of:
   selecting a sequence number to be used as the current receiver data frame sequence number.

3. The method according to claim 1, wherein the current receiver data frame sequence numbers are incorporated in one of a mirror hearer, a VID field in the VLAN tag or 802.2 SNAP org field.

4. A method for receiving duplicated frames in a mirrored data communication network system comprising at least one sender node and at least one receiver node and at least two data communication networks between a sender node and a receiver node, wherein the method comprises the steps of:
   creating and maintaining at least one data structure comprising one or more entries, an entry comprising at least a current sender data frame sequence number;
   receiving a data frame;
   utilizing at least a sender address and a receiver address of the received data frame to compute a hash code, the hash code being an index to the at least one data structure;
   checking the current sender data frame sequence number in the entry indexed by the computed hash code; and if the sequence number of the received frame does not fulfill a predetermined condition in comparison with the current sender data frame sequence number in the entry, discarding the data frame;
otherwise accepting the data frame, wherein if the receiver node becomes unsynchronized with the sender node, the receiver node is put into a starting phase to resynchronize the receiver node with the sender node.

5. The method according to claim 4, wherein the method comprises the step of:
discarding the data frame if the sequence number of the received frame is smaller than the current sender data frame sequence number in the entry.

6. The method according to claim 4, wherein the method comprises the step of:
discarding the data frame if the sequence number of the received frame is greater than the current sender data frame sequence number in the entry.

7. The method according to claim 4, wherein if the sequence number of the received data frame is equal or greater than the current sender data frame sequence number in the entry incremented by a predetermined window size, discarding the data frame.

8. The method according to claim 4, wherein if the sequence number of the received data frame is equal or smaller than the current sender data frame sequence number in the entry decremented by a predetermined window size, discarding the data frame.

9. The method according to claim 4, wherein the method further comprises the step of:
maintaining a discard counter for each sender.

10. The method according to claim 9, wherein the method further comprises the steps of:
counting discarded data frames of a sender with the discard counter; and when the discard counter exceeds a predetermined discard threshold value;
determining that the sender is not synchronized;
resetting the discard counter of the sender;
accepting the next packet from the sender automatically; and
updating the current receiver data frame sequence number.

11. The method according to claim 9, wherein if the predetermined condition is fulfilled, the method comprises the steps of:
accepting the data frame;
updating the current sender data frame sequence number; and
resetting the discard counter of the sender.

12. The method according to claim 4, wherein when the receiver is out of synchronization, the method further comprises the steps of:
entering into a starting phase;
accepting the next packet from each sender automatically; and
updating the current receiver data frame sequence number.

13. A system for sending duplicated frames in a mirrored data communication network system comprising at least one sender node and at least one receiver node and at least two data communication networks between a sender node and a receiver node, wherein a data frame is duplicated and sent to a receiver node via at least two data communication networks, wherein the system further comprises:
at least one data structure comprising one or more entries, an entry comprising at least a current receiver data frame sequence number, wherein a single current receiver data frame sequence number is maintained for each receiver node, and a current sender data frame sequence number is maintained for each sender node;
means for finding Out the current receiver data frame sequence number based on the receiver address information;
means for marking the data frame to be sent to the receiver via the data communication networks with the current receiver data frame sequence number;
means for duplicating the data frame;
means for sending the data frame to the receiver via at least two data communication networks; and
means for at least one of updating the current receiver data frame sequence number and putting the receiver node into a starting phase to resynchronize the receiver node with the sender node if the receiver node has become unsynchronized with the sender node.

14. The system according to claim 13, wherein the system further comprises:
means for selecting a sequence number to be used as the current receiver data frame sequence number if the sender is starting or restarted.

15. The system according to claim 13, wherein the current receiver data frame sequence numbers are incorporated in one of a mirror hearer, a VID field in the VLAN tag or 802.2 SNAP org field.

16. A system for receiving duplicated frames in a mirrored data communication network system comprising at least one sender node and at least one receiver node, at least two data communication networks between a sender node and a receiver node, wherein a data frame is duplicated and sent to a receiver node via at least two data communication networks, wherein the system further comprises:
at least one data structure comprising one or more entries, an entry comprising at least a current sender data frame sequence number;
means for receiving data frames;
means for utilizing at least a sender address and a receiver address of the received data frames to compute a hash code the hash code being an index to the at least one data structure;
means for checking the current sender data frame sequence number in the entry indexed by the computed hash code; and
means for discarding the data frame, wherein the received frame is discarded if the sequence number of the received frame does not fulfill a predetermined condition in comparison with the current sender data frame sequence number in the entry, and
means for otherwise accepting the data frames, wherein if the receiver node becomes unsynchronized with the sender node, the receiver node is put into a starting phase to resynchronize the receiver node with the sender node.

17. The system according to claim 16, wherein means for discarding are arranged to discard the data frame if the sequence number of the received frame is smaller than the current sender data frame sequence number in the entry.

18. The system according to claim 16, wherein means for discarding are arranged to discard the data frame if the sequence number of the received frame is greater than the current sender data frame sequence number in the entry.

19. The system according to claim 16, wherein means for discarding are arranged to discard the data frame if the sequence number of the received data frame is equal or greater than the current sender data frame sequence number in the entry incremented by a predetermined window size.

20. The system according to claim 16, wherein means for discarding are arranged to discard the data frame if sequence number of the received data frame is equal or smaller than the current sender data frame sequence number in the entry decremented by a predetermined window size.

21. The system according to claim 16, wherein the system further comprises a discard counter for each sender.

22. The system according to claim 21, wherein the discard counter is arranged to count discarded data frames of a sender, wherein the system further comprises:
   a predetermined discard threshold value;
   means for determining that the sender is not synchronized when the discard counter exceeds the predetermined discard threshold value;
   means for resetting the discard counter of the sender;
   means for accepting the next packet from the sender automatically; and
   means for updating the current sender data frame sequence number.

23. The system according to claim 21, wherein the system further comprises:
   means for accepting the data frame, means for accepting being arranged to accept the data frame if the predetermined condition is fulfilled;
   means for updating the current sender data frame sequence number; and
   means for resetting the discard counter of the sender.

24. The system according to claim 16, wherein the system further comprises:
   means for determining that the receiver is out of synchronization;
   means for accepting the next packet from each sender automatically; and
   means for updating the current receiver data frame sequence number.

25. A minor driver for sending duplicated frames in a mirrored data communication network system comprising at least one sender node and at least one receiver node and at least two data communication networks between a sender node and a receiver node, wherein a data frame is duplicated and sent to a receiver node via at least two data communication networks, wherein the mirror driver further comprises:
   at least one data structure comprising one or more entries, an entry comprising at least a current receiver data frame sequence number, wherein a single current receiver data frame sequence number is maintained for each receiver node, and a current sender data frame sequence number is maintained for each sender node;
   a finding unit configured to find out the current receiver data frame sequence number based on the receiver address information;
   a marking device configured to mark the data frame to be sent to the receiver via the data communication networks with the current receiver data frame sequence number;
   a duplication device configured to dublicate the data frame;
   a sending unit configured to send the data frame to the receiver via at least two data communication networks; and
   at least one of an updating device configured to update the current receiver data frame sequence number and putting the receiver node into a starting phase to resynchronize the receiver node with the sender node if the receiver node has become unsynchronized with the sender node.

26. The mirror driver according to claim 25, wherein the mirror driver further comprises:
   a selector configured to select a sequence number to be used as the current receiver data frame sequence number if the sender is starting or restarted.

27. The mirror driver according to claim 26, wherein the current receiver data frame sequence numbers are incorporated in one of a mirror hearer, a VID field in the VLAN tag or 802.2 SNAP org field.

28. A mirror driver for receiving duplicated frames in a mirrored data communication network system comprising at least one sender node and at least one receiver node, at least two data communication networks between a sender node and a receiver node, wherein a data frame is duplicated and sent to a receiver node via at least two data communication networks, wherein the mirror driver further comprises:
   at least one data structure comprising one or more entries, an entry comprising at least a current sender data frame sequence number;
   a receiver configured to receive data frames;
   a computing unit configured to utilize at least a sender address and a receiver address of the received data frames to compute a hash code the hash code being an index to the at least one data structure;
   a checker configured to check the current sender data frame sequence number in the entry indexed by the computed hash code; and
   a discarding device configured to discard the data frame, wherein the received frame is discarded if the sequence number of the received frame does not fulfill a predetermined condition in comparison with the current sender data frame sequence number in the entry, and
   a synchronizer for otherwise accepting the data frames, wherein if the receiver node becomes unsynchronized with the sender node, the receiver node is put into a starting phase to resynchronize the receiver node with the sender node.

29. The mirror driver according to claim 28, wherein the discarding device is further arranged to discard the data frame if the sequence number of the received frame is smaller than the current sender data frame sequence number in the entry.

30. The mirror driver according to claim 28, wherein the discarding device is further arranged to discard the data frame if the sequence number of the received frame is greater than the current sender data frame sequence number in the entry.

31. The mirror driver according to claim 28, wherein the discarding device is further arranged to discard the data frame if the sequence number of the received data frame is equal or greater than the current sender data frame sequence number in the entry incremented by a predetermined window size.

32. The mirror driver according to claim 28, wherein the discarding device is further arranged to discard the data frame if sequence number of the received data frame is equal or smaller than the current sender data frame sequence number in the entry decremented by a predetermined window size.

33. The mirror driver according to claim 28, wherein the mirror driver further comprises a discard counter for each sender.

34. The mirror driver according to claim 33, wherein the discard counter is arranged to count discarded data frames of a sender, wherein the mirror driver further comprises:

a predetermined discard threshold value;

a determining device configured to determine that the sender is not synchronized when the discard counter exceeds the predetermined discard threshold value;

a resetting device configured to reset the discard counter of the sender;

an accepting device configured to accept the next packet from the sender automatically; and an updating device configured to update the current sender data frame sequence number.

35. The mirror driver according to claim 33, wherein the minor driver further comprises:

an accepting device configured to accept the data frame, means for accepting being arranged to accept the data frame if the predetermined condition is fulfilled;

an updating device configured to update the current sender data frame sequence number; and a resetting device configured to reset the discard counter of the sender.

36. The mirror driver according to claim 28, wherein the mirror driver further comprises:

a determining device configured to determine that the receiver is out of synchronization;

an accepting device configured to accept the next packet from each sender automatically; and an updating device configured to update the current receiver data frame sequence number.

37. A system for sending duplicated frames in a mirrored data communication network system comprising at least one sender node and at least one receiver node and at least two data communication networks between a sender node and a receiver node, wherein a data frame is duplicated and sent to a receiver node via at least two data communication networks, wherein the system further comprises:

at least one data structure comprising one or more entries, an entry comprising at least a current receiver data frame sequence number, wherein a single current receiver data frame sequence number is maintained for each receiver node, and a current sender data frame sequence number is maintained for each sender node;

a finding unit configured to find out the current receiver data frame sequence number based on the receiver address information;

a marking device configured to mark the data frame to be sent to the receiver via the data communication networks with the current receiver data frame sequence number;

a duplication device configured to duplicate the data frame;

a sending unit configured to send the data frame to the receiver via at least two data communication networks; and at least one of an updating device configured to update the current receiver data frame sequence number and a synchronizing device configured to put the receiver node into a starting phase to resynchronize the receiver node with the sender node if the receiver node has become unsynchronized with the sender node.

38. A system for receiving duplicated frames in a mirrored data communication network system comprising at least one sender node and at least one receiver node, at least two data communication networks between a sender node and a receiver node, wherein a data frame is duplicated and sent to a receiver node via at least two data communication networks, wherein the system further comprises:

at least one data structure comprising one or more entries, an entry comprising at least a current sender data frame sequence number;

a receiver configured to receive data frames;

a computing unit configured to utilize at least a sender address and a receiver address of the received data frames to compute a hash code, the hash code being an index to the at least one data structure;

a checker configured to check the current sender data frame sequence number in the entry indexed by the computed hash code; and a discarding device configured to discard the data frame, wherein the received frame is discarded if the sequence number of the received frame does not fulfill a predetermined condition in comparison with the current sender data frame sequence number in the entry, and a synchronizer for otherwise accepting the data frames wherein if the receiver node becomes unsynchronized with the sender node, the receiver node is put into a starting phase to resynchronize the receiver node with the sender node.

* * * * *